(12) United States Patent
Nagase et al.

(10) Patent No.: US 7,788,029 B2
(45) Date of Patent: Aug. 31, 2010

(54) TRAVELED LINK IDENTIFYING SYSTEMS, METHODS, AND PROGRAMS

(75) Inventors: Kenji Nagase, Okazaki (JP); Masami Kusunose, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 366 days.

(21) Appl. No.: 11/645,063

(22) Filed: Dec. 26, 2006

(65) Prior Publication Data
US 2007/0150185 A1 Jun. 28, 2007

(30) Foreign Application Priority Data
Dec. 26, 2005 (JP) ............................... 2005-373388

(51) Int. Cl.
*G01C 21/32* (2006.01)
(52) U.S. Cl. ...................................... 701/209; 701/200
(58) Field of Classification Search .................. 701/201, 701/207, 209
See application file for complete search history.

(56) References Cited

U.S. PATENT DOCUMENTS

| 6,895,331 | B2  | 5/2005  | Yoshida              |
|-----------|-----|---------|----------------------|
| 2003/0023375 | A1  | 1/2003  | Yoshida              |
| 2004/0104842 | A1* | 6/2004  | Drury et al. ............ 342/357.13 |
| 2004/0220728 | A1* | 11/2004 | Cayford ...................... 701/209 |
| 2004/0249568 | A1* | 12/2004 | Endo et al. ................... 701/209 |

FOREIGN PATENT DOCUMENTS

| JP | A-2003-035548 | 2/2003 |
| JP | A 2003-281674 | 10/2003 |
| JP | A-2004-138477 | 5/2004 |
| JP | A-2004-354395 | 12/2004 |
| JP | 2005-091304 A | 4/2005 |
| WO | WO 98/25107 | 6/1998 |
| WO | WO 99/51940 | 10/1999 |
| WO | WO 2006/125291 A1 | 11/2006 |

OTHER PUBLICATIONS

European Search Report issued on Dec. 2, 2009 in European Patent Application No. 09011384.6.

* cited by examiner

*Primary Examiner*—Mark Hellner
*Assistant Examiner*—Helal A Algahaim
(74) *Attorney, Agent, or Firm*—Oliff & Berridge, PLC

(57) ABSTRACT

Traveled link identifying system systems, methods, and programs receive information representing current positions of probe vehicles, the information acquired from each probe vehicle at predetermined distance intervals or at predetermined time intervals. The systems, methods, and programs store connection relationships between links, the links representing portions of roads within map data, and acquire position information from the communication device. The systems, methods, and programs detect links traveled by a probe vehicle on the basis of the acquired position information and determine, based on the stored connection relationships, whether it is possible to uniquely identify one combination of links connecting the detected traveled links. The systems, methods, and programs identify a path traveled by the probe vehicle as being a path between the detected travel links along the unique combination of links.

13 Claims, 14 Drawing Sheets

TRAVELED POINT TABLE

| ID | TIME | COORDINATES |
|---|---|---|
| 11122 | 8:00 | (x1, y1) |
| | 8:01 | (x2, y2) |
| | 8:02 | (x3, y3) |
| | 8:03 | (x4, y4) |
| | 8:04 | (x5, y5) |
| | ... | ... |
| 11123 | 14:33 | (x11, y11) |
| | 14:34 | (x12, y12) |
| | 14:35 | (x13, y13) |
| | 14:36 | (x14, y14) |
| | 14:37 | (x15, y15) |
| | ... | ... |
| ⋮ | ⋮ | ⋮ |

FIG. 4

STATISTICAL LINK DATABASE

| LINK NUMBER | DATE/TIME OF TRAVEL | TRAVEL TIME |
|---|---|---|
| YY1 | 2005/9/12 17:02 | 30 SEC |
| | 2005/9/12 17:07 | 25 SEC |
| | 2005/9/13 14:15 | 32 SEC |
| | 2005/9/13 14:22 | 48 SEC |
| | 2005/9/13 21:30 | 24 SEC |
| | ... | ... |
| YY2 | 2005/9/12 12:03 | 50 SEC |
| | 2005/9/14 9:15 | 62 SEC |
| | ... | ... |
| ⋮ | ⋮ | |

FIG. 5

TRAVEL HISTORY DATABASE

| ID | TRAVEL START TIME | TRAVELED LINK |
|---|---|---|
| 11345 | 2005/9/12 17:02 | XY1 |
| | 2005/9/12 17:07 | XY2 |
| | 2005/9/12 17:15 | ZZ2 |
| | 2005/9/12 17:22 | ZZ3 |
| | 2005/9/12 17:30 | YX1 |
| | ... | ... |
| 11346 | 2005/9/14 12:03 | VX1 |
| | 2005/9/14 12:15 | VX2 |
| | ... | ... |
| ⋮ | ⋮ | |

FIG. 6

(1) EXAMPLE IN WHICH DETECTED
    TWO POINTS ARE LOCATED ON THE SAME LINK (2) EXAMPLE IN WHICH DETECTED TWO LINKS ARE DIRECTLY CONNECTED (3) EXAMPLE (FIRST EXAMPLE) IN WHICH IT IS POSSIBLE TO UNIQUELY IDENTIFY ONE COMBINATION OF LINKS CONNECTING BETWEEN DETECTED TWO LINKS (4) EXAMPLE (SECOND EXAMPLE) IN WHICH IT IS POSSIBLE TO UNIQUELY IDENTIFY ONE COMBINATION OF LINKS CONNECTING BETWEEN DETECTED TWO LINKS (5) EXAMPLE IN WHICH THERE IS A CONNECTION LINK DEFINED AS BEING THE SAME LINK IN AN UPPER LEVEL AS EACH DETECTED LINK OF INTEREST CONNECTED TO THE CONNECTION LINK (6) EXAMPLE IN WHICH THERE IS A CONNECTION LINK BEING IN A NATURAL CONNECTION RELATIONSHIP WITH A DETECTED LINK CONNECTED TO THE CONNECTION LINK (7) EXAMPLE IN WHICH THERE IS A LINK TRAVELED IN THE PAST IN THE ZONE BETWEEN THE DETECTED LINKS

TRAVELED LINK IDENTIFYING SYSTEMS, METHODS, AND PROGRAMS

INCORPORATION BY REFERENCE

The disclosure of Japanese Patent Application No. 2005-373388, filed on Dec. 26, 2005, including the specification, drawings and abstract thereof, is incorporated herein by reference in its entirety.

BACKGROUND

1. Related Technical Fields

Related technical fields include systems, methods, and programs, capable of identifying a route traveled by a vehicle.

2. Description of the Related Art

Nowadays, many vehicles are equipped with a navigation apparatus that provides route guidance so that a driver can easily reach a destination. A typical navigation apparatus detects a current vehicle position using a GPS receiver, acquires map data corresponding to the current position from a storage medium such as a DVD-ROM or an HDD or via a network, and displays the map on a liquid crystal display monitor. If a user specifies a destination, the navigation apparatus searches for a route from the vehicle position to the specified destination and displays a recommended route on a display screen. When the vehicle is approaching each intersection, voice guidance is provided so that the driver can reach the destination.

When a route is searched for, various "costs" are defined for links or nodes depending on, for example, road types such as expressways, toll roads, national roads, major local roads, prefectural roads, minor streets, etc., traffic restrictions such as a turn restriction, a one-way restriction, etc., link lengths, road widths, the number of traffic lanes, etc. The "cost" is generally a measure of the desirability of including an associated link or node in a recommended route. To search for an optimum route from a current vehicle position to a destination, links described in map data are examined starting from both the current vehicle position and the destination to find an optimum route. When a route found in searching started from the current vehicle position meets somewhere a route found in searching started from the destination, the sum of costs for the route from the current vehicle position and the sum of costs for the route from the destination are added together to determine the total cost. The total cost is calculated for each possible route, and a route having a minimum total cost is employed as a navigation route.

A travel time needed to travel each link is one of factors that may be considered in determining the cost during route searching. However, the travel time depends not only on the link length and the link type but also other traffic conditions such as congestion. Thus, real-time traffic information (in terms of congestion etc.) is needed to predict the travel time. It is known to collect such traffic information using sensors installed on roadsides, as is the case in Vehicle Information and Communication System (VICS®). It is also known to collect traffic information from particular vehicles called information probing vehicles running on roads.

For example, Japanese Unexamined Patent Application Publication No. 2003-281674 discloses a traffic information processing system adapted to determine point-to-point travel times and determine whether there is traffic congestion, on the basis of times at which information probing vehicles pass through two specified points.

SUMMARY

However, in the traffic information processing system disclosed in Japanese Unexamined Patent Application Publication No. 2003-281674, because traffic congestion, travel times, and other traffic parameters are determined on the basis of times at which two points are passed through, it may be difficult to identify the particular routes traveled by the probe vehicles between the two points. For example, a certain probe vehicle may travel along a shortest route between points, while another probe vehicle may travel along a route that is longer between the same two points, but is easier to drive. In particular, when two points are rather far apart from each other and there are many possible routes between the two points, it is difficult to correctly determine traffic congestion, travel times, and other similar parameters on the basis of passing times between the two points.

Exemplary implementations of the broad principles described herein provide systems, methods, and programs, that may identify a particular link traveled by a vehicle on the basis of information indicating a vehicle position and that may determine traffic congestion, a travel time, and/or other traffic parameters based on the identified link.

Exemplary implementations provide systems, methods, and programs that may receive information representing current positions of probe vehicles, the information acquired from each probe vehicle at predetermined distance intervals or at predetermined time intervals. The systems, methods, and programs may store connection relationships between links, the links representing portions of roads within map data, and may acquire position information from the communication device. The systems, methods, and programs may detect links traveled by a probe vehicle on the basis of the acquired position information and may determine, based on the stored connection relationships, whether it is possible to uniquely identify one combination of links connecting the detected traveled links. The systems, methods, and programs may identify a path traveled by the probe vehicle as being a path between the detected travel links along the unique combination of links.

Exemplary implementations provide systems, methods, and programs that may receive information representing current positions of probe vehicles, the information acquired from each probe vehicle at predetermined distance intervals or at predetermined time intervals. The systems, methods, and programs may store connection relationships between links, the links representing portions of roads within map data, the connection relationships stored in a plurality of hierarchical levels, each level defined based on the detail of road information within the level. The systems, methods, and programs may acquire position information from the communication device, the position information related to the position of a probe vehicle within a particular level of the map data and may detect links traveled by the probe vehicle on the basis of the acquired position information. The systems, methods, and programs may determine, based on the stored connection relationships, whether a connection link connected to a first one of the detected traveled links and the first detected travel link belong to a same link in a level of the map data with less detail than the particular level and, if the connection link connected to the first detected traveled link and the first detected travel link belong to the same link in the level of the map data with less detail than the particular level, may set the connection link connected to the first detected traveled link as one of a unique combination of links. The systems, methods, and programs may identify a path traveled by the probe vehicle as being a path between the detected travel links along the unique combination of links.

BRIEF DESCRIPTION OF THE DRAWINGS

Exemplary implementations will now be described with reference to the accompanying drawings, wherein:

FIG. 4 shows an exemplary traveled point table;

FIG. 5 shows an exemplary format of data stored in a statistical link database;

FIG. 6 shows an exemplary format of data stored in a travel history database;

DETAILED DESCRIPTION OF EXEMPLARY IMPLEMENTATIONS

Figure 1:
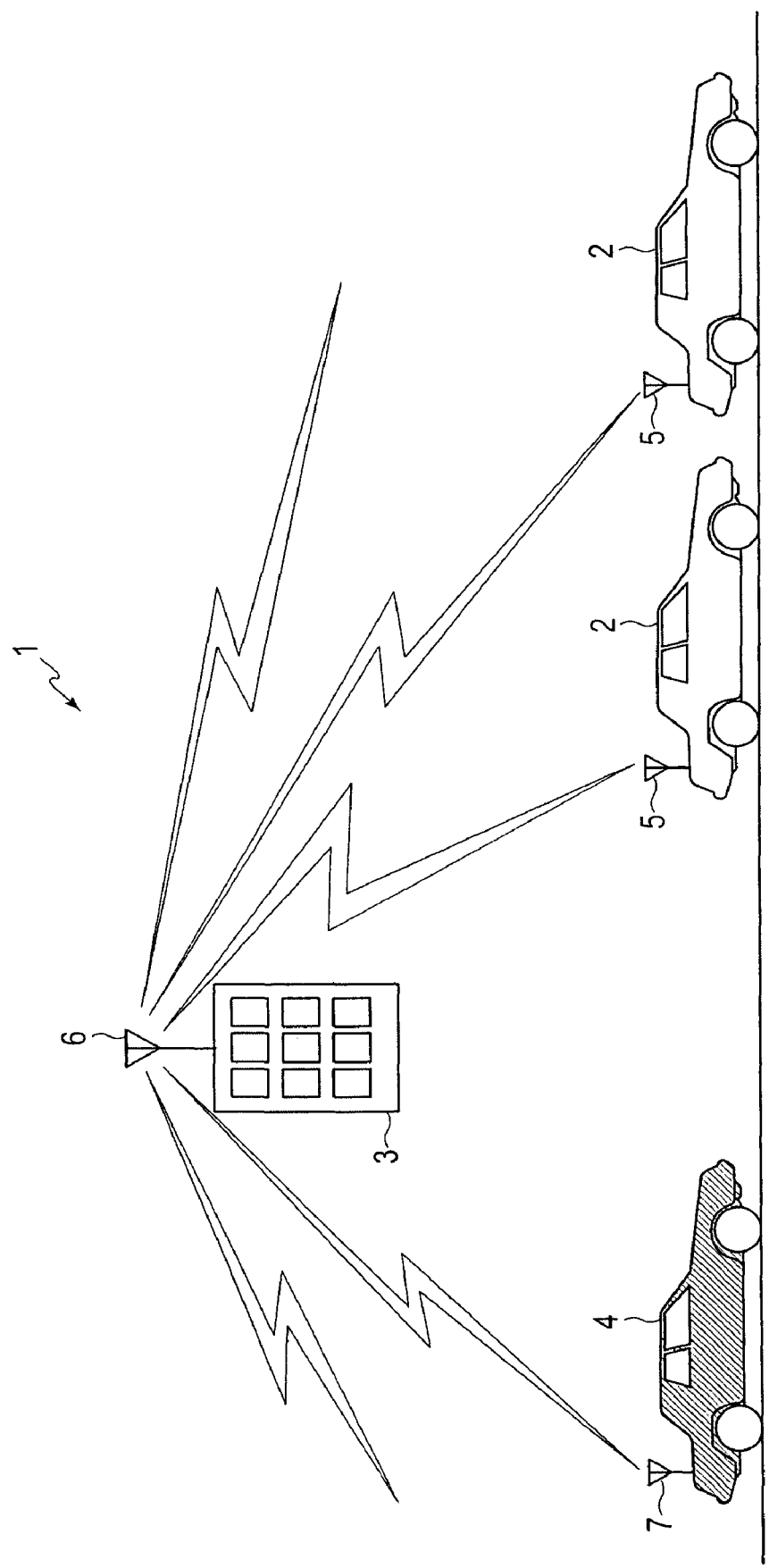
FIG. 1 is a schematic diagram of an exemplary traveled link identifying system.

As shown in FIG. 1, an exemplary traveled link identifying system 1 may include a plurality of information probing vehicles 2 that travel on roads and collect probed information. The traveled link identifying system 1 may include an information probing center 3 that may receive and store probed information transmitted from the information probing vehicles 2 and may produce traffic information (such as link travel times) from the stored probed information. The traveled link identifying system 1 may include a terminal vehicle 4, which is a vehicle using traffic information sent from the information probing center 3.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

The information probing vehicles 2 and the information probing center 3 may communicate with each other via a communication device 5 disposed in each information probing vehicle 2 and a center communication device 6 disposed in the information probing center 3. The information probing center 3 and the terminal vehicle 4 may communicate with each other via the center communication device 6 and a terminal communication device 7 disposed in the terminal vehicle 4.

The communication device 5 may, for example, communicate probed information to the information probing center 3 via the communication network 10 (FIG. 2), may also serve as a beacon receiver for receiving radio wave beacon signals or light beacon signals via radio wave beacon devices or light beacon devices installed along roads. The communication device 5 may be a network device capable of performing communication in a communication system using a communication network such as a LAN, a WAN, an intranet, a mobile telephone network, a telephone network, a public communication network, a private communication network, or the Internet.

The probed information acquired by each information probing vehicle 2 and transmitted via the communication device 5 may include, for example, a current vehicle position, a destination set in the navigation apparatus, a shift lever position, a steering angle, an accelerator pedal position, a brake pressure, a remaining engine oil quantity, a remaining fuel quantity, a seat belt wearing status, a vehicle speed, a vehicle running direction, a vehicle travel distance, a windshield wiper operation status, a turn signal status, and a current time. In addition to the information associated with the vehicle, the probed information may further include information acquirable by the vehicle, such as information associated with the vehicle's environment. Specifically, for example, the probed information may further include an image taken by a camera installed on the front end or the back end of the vehicle, the distance to another vehicle running ahead detected using millimeter wave radar, the speed of the vehicle running ahead, etc.

The center communication device 6 may, for example, receive the probed information from the information probing vehicle 2 via the communication network 10 and may transmit traffic information produced from the collected probed information to the terminal vehicle 4.

The terminal communication device 7 may, for example, receive traffic information transmitted from the information probing center 3 to the terminal vehicle 4 via the communication network 10.

Although the information probing vehicles 2 are shown separately from the terminal vehicle 4, the terminal vehicle 4 may also be used as an information probing vehicle 2, and the information probing vehicles 2 may also be terminal vehicles 4. Furthermore, instead of the terminal vehicle 4, an information terminal such as a portable telephone, a PDA device, or a personal computer may be used to receive information from the center communication device 6.

Figure 2:
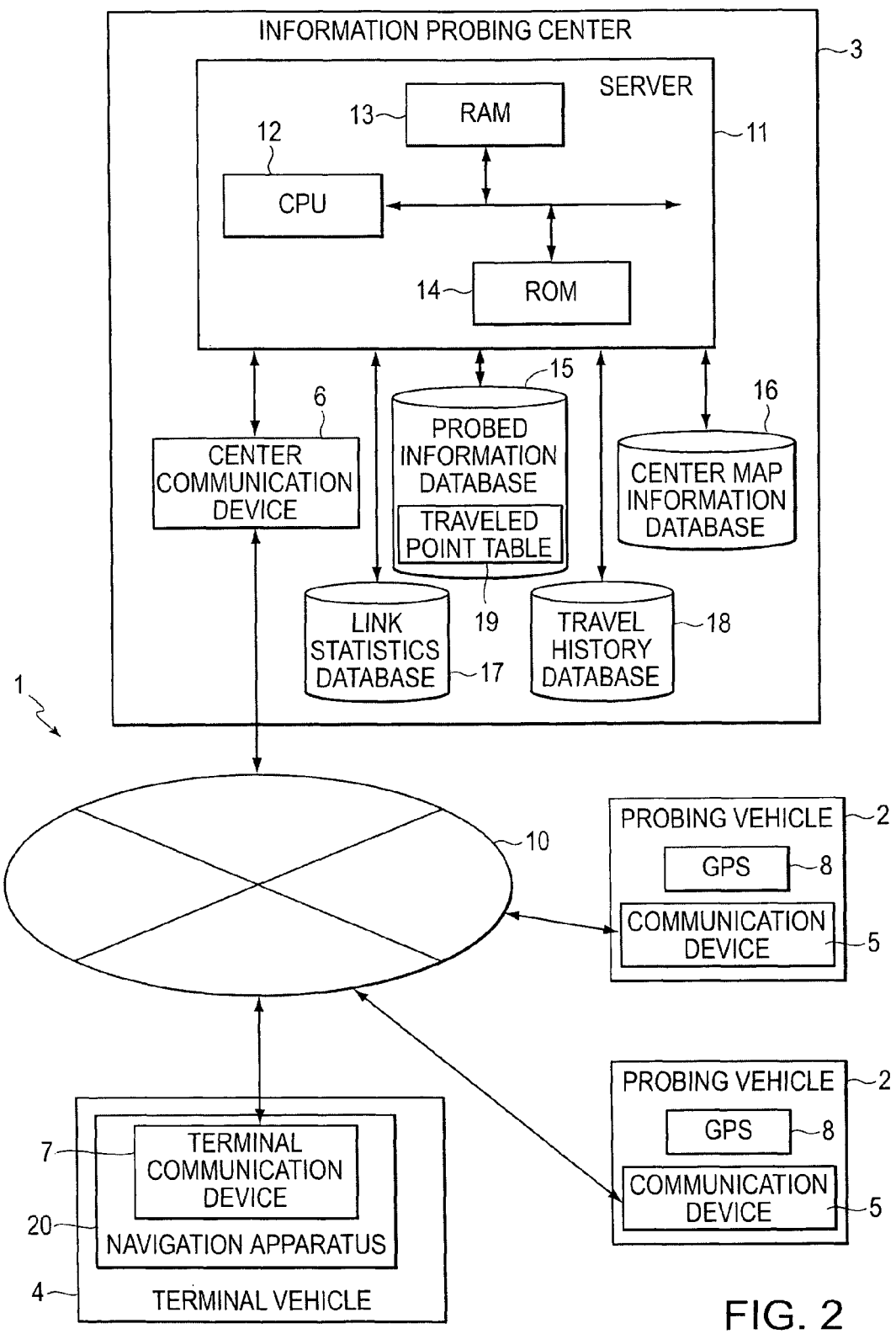
FIG. 2 is a block diagram showing an exemplary information probing center and other exemplary parts of a traveled link identifying system.
Figure 3:
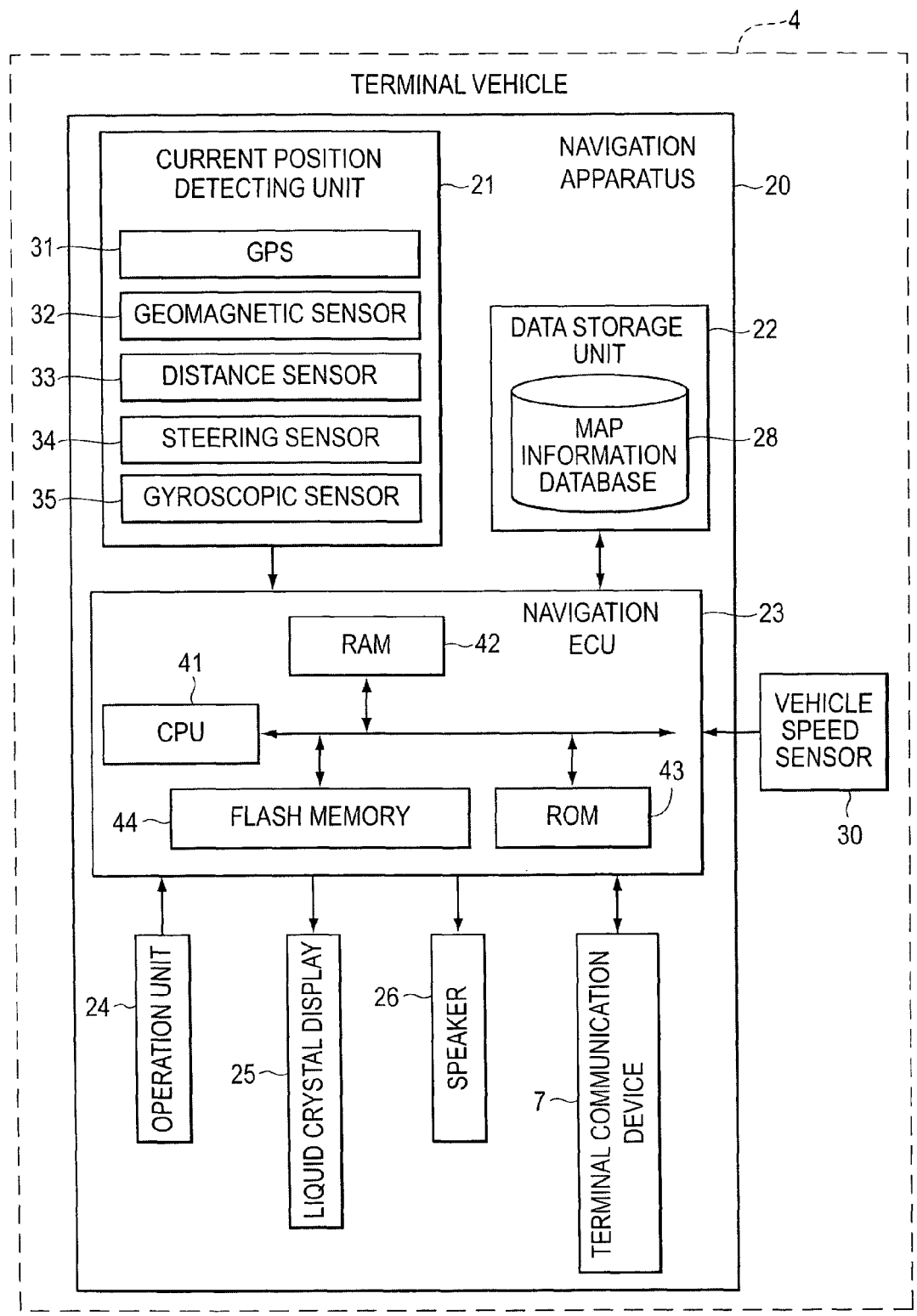
FIG. 3 is a block diagram showing an exemplary internal structure of a terminal vehicle.

FIG. 2 shows an exemplary configuration of a traveled link identifying system 1. FIG. 3 shows an exemplary configuration of the terminal vehicle 4 in the traveled link identifying system 1.

As shown in FIG. 2, the traveled link identifying system 1 may include the information probing vehicle 2, the information probing center 3, the terminal vehicle 4, and the communication network 10. The information probing vehicle 2, the information probing center 3, and the terminal vehicle 4 may send/receive various kinds of information via the communication network 10.

A GPS 8 may be installed in each information probing vehicle 2. The probed information (e.g., for the current vehicle position, the current time, etc) may be acquired via the GPS 8 and transmitted to the information probing center 3 at predetermined time intervals (e.g., every minute). A navigation apparatus including a GPS 8 and a communication device 5 may be installed in each information probing vehicle 2.

The information probing center 3 may include the center communication device 6, a controller (server 11), and one or more memories. The memory(ies) may include, for example, a probed information database 15 connected to the server 11, a center map information database 16, a statistical link database 17, and a travel history database 18. The server 11 may include a CPU 12 serving as a processing device and a control device for controlling the server 11, and internal storage devices such as a RAM 13 and a ROM 14. The RAM 13 may be used by the CPU 12, for example, as a working memory in various calculations. In the ROM 14, a traveled link identifying program (FIGS. 7 and 8) and other various control programs to control the server 11 may be stored. The traveled link identifying program may identify links traveled by the information probing vehicle on the basis of position information indicating positions of the information probing vehicle 2 at predetermined time intervals included in the probed information stored in the probed information database 15. The traveled link identifying program may calculate the travel time of each of links traveled by the information probing vehicle 2. Control programs may include, for example, a traffic information transmission program that may transmit traffic information in response to a request from the terminal vehicle 4. An MPU or the like may be used instead of the CPU 12.

The probed information database 15 may store received probed information transmitted from respective information probing vehicles 2 at predetermined time intervals via the communication network 10. A hard disk may be used as a storage medium on which the probed information database 15 is stored. Alternatively, a memory card, a magnetic tape, a magnetic drum, a CD, an MD, a DVD, an optical disk, an MO, an IC card, or optical card may be used as the external storage device.

In the probed information database 15 of the information probing center 3, there may be stored traveled point table 19. Position coordinates indicating the locations, at specified times, of the respective information probing vehicles 2 running over the entire nation may be recorded in the traveled point table 19. FIG. 4 shows an example of a traveled point table 19.

In the traveled point table 19, as shown in FIG. 4, identification codes ID identifying respective information probing vehicles 2 and coordinates indicating the locations of the respective information probing vehicles 2 at respective specified times may be recorded. That is, in the traveled link identifying system 1, each information probing vehicle 2 may detect the current time using the GPS 8 installed in the information probing vehicle 2. Then, the vehicle 2 may, for example, detect the vehicle position using the GPS 8 every minute, and may transmit the detected vehicle position together with the current time as the probed information to the information probing center 3.

Thus, the server 11 may be capable of identifying a route traveled in the past and a route being currently traveled by each information probing vehicle 2 on the basis of the traveled point table 19.

The center map information database 16 may store map data necessary to identify links traveled by the information probing vehicle 2. The map data may include map display data for displaying a map, intersection data associated with intersections, link data associated with links, node data associated with nodes, and facility data associated with facilities.

The map data may be described, for example, in three hierarchical levels depending on the amount of information associated with road networks. Specifically, for example, the map data may be described in the form of a grid with a size of 10 km squares in the case of the first level, 20 km squares in the second level, and 40 km squares in the third level. The map data in a lower level has a greater amount of information on road networks than the map data in a higher level. For example, in the third level, the map data may include information associated with national expressways, freeways, urban expressways, and toll roads. In the second level, the map data may additionally include information associated with major roads such as national roads and prefectural roads. In the first level, the map data may additionally include detailed information associated with all roads including minor streets.

In lower levels, the map data has smaller grid sizes and includes more detailed information. However, the map data in lower levels does not cover a large area. In contrast, in higher levels, the map data covers larger areas, although the map data includes only rough information. For example, in the lowest level (e.g., first level), the grid size is selected to be small enough to describe all roads including minor streets. However, the grid only covers a small area such as, for example, a city, town, or a village. On the other hand, in the highest level (e.g., third level), the grid size is selected to be large enough to cover, for example, an entire state or nation. However, the highest level map data includes only information associated with major roads such as expressways and toll roads.

In each level, the map data may also include map display data representing a geometrical shape of a map to be displayed.

The link data included in the map data in each level may include data indicating properties of each link in terms of the road width, the slope, the cant, the bank, the road surface condition, the number of lanes, a zone with a smaller number of lanes, a zone with a smaller road width, and a crossing with a railway, data associated with corners or curves in terms of the curvature radius, the corner type such as intersections or T junctions, locations of entrances or exits of corners, data indicating road properties such as downhill roads or uphill roads, data indicating road types such as general roads such as national roads, prefectural roads, and minor streets, or toll roads such as national expressways, motorways, urban expressways, and general toll roads, and special toll roads such as toll bridges.

For toll roads, the link data may include data indicating rampways at entrances or exits, locations of toll gates (interchanges), etc. The link data may also include data indicating travel times needed to travel respective links. The link data may also include a link connection relationship list and a natural link connection list. In the link connection relationship list, the link number assigned to each of one or more connection links connected to each link may be described to represent the connection property of each link. In the natural link connection list, there is described data indicating whether connection links connected to each link of interest have the natural link connection relationship with the link of interest. Note that the natural link connection relationship refers to a special link-to-link relationship between one link and another link with a property which is substantially the same as or very similar to that of the former link. Specifically, for example, two links are determined to have the natural link connection relationship when (1) both links are located on a single straight line, (2) both links are similar in pavement, (3) both links are the same in slope type (a downhill slope or an uphill slope), (4) both links are similar in road width, (5) both links have a similar center line, (6) both links are connected at a smallest angle among all link connections, and/or (7) there is no STOP sing between two links.

In each level of the map data, the node data may include data indicating branchpoints (or intersections or T junctions) of roads, data indicating coordinates (locations) of nodes defined on roads at predetermined distance intervals depending on the curvature radius or other parameters, data indicating node property indicating whether nodes are defined at intersections, a connection link number list indicating link numbers of links connected to each node, an adjacent node number list indicating node numbers of nodes adjacent to each node, and data indicating the height (altitude) of each node.

The facility data may include data associated with buildings such as hotels, hospitals, service stations, parking lots, sightseeing facilities, interchanges, restaurants, and service areas, together with facility IDs identifying respective buildings.

The statistical link database 17 may store times needed (in the past) for the information probing vehicle 2 to travel respective links described in the map data in the center map information database 16. FIG. 5 shows an exemplary format of data stored in the statistical link database 17.

In the statistical link database 17, a link number identifying each link, a date/time when each link was traveled by an information probing vehicle 2, and a time needed to travel each link may be described. The server 11 may, for example, identify a link traveled by an information probing vehicle 2 on the basis of the average value of times needed to travel links stored in the statistical link database 17, and may thus produce travel times reflecting traffic information (described below, e.g., in step S4 in FIG. 7).

The travel history database 18 may store a travel history of each information probing vehicle 2. FIG. 6 shows an exemplary format of data stored in a travel history database 18.

In the travel history database 18, an ID identifying each information probing vehicle 2, links traveled in the past by each information probing vehicle 2, and times at which the traveling of each links began may be described. On the basis of data indicating the links traveled in the past by the respective information probing vehicles 2, the server 11 may identify links traveled next time by the respective information probing vehicles 2, and may thus produce travel times reflecting traffic information (described below, e.g., in step S4 in FIG. 7).

FIG. 3 shows an exemplary configuration of the terminal vehicle 4 including, a navigation apparatus 20 having a terminal communication device 7. The navigation apparatus 20 may include a current position detecting unit 21 for detecting a current vehicle position, a memory (data storage unit 22) in which various kinds of data may be stored, a controller (navigation ECU 23) for performing various kinds of calculations or control operations in accordance with input information, an operation unit 24 used by a user to input a command or data, a liquid crystal display 25 for displaying information such as a map, a speaker 26 for outputting audio guidance associated with a route, and the terminal communication device 7 for communicating with the information probing center 3 or other traffic information centers. The navigation ECU 23 may be connected to a vehicle speed sensor 30 for detecting the running speed of the vehicle.

The current position detecting unit 21 may include a GPS 31, a geomagnetic sensor 32 (compass), a distance sensor 33, a steering sensor 34, a gyroscopic sensor 35 serving as a direction detector, and an altimeter (not shown), whereby the current position and direction of the vehicle and the distance to a target (such as an intersection) may be detected.

Specifically, the GPS 31 may receive radio waves transmitted from artificial satellites and detects the current global position of the vehicle from the received radio waves. The geomagnetic sensor 32 may measure geomagnetism to detect the direction of the vehicle. The distance sensor 33 may detect the distance between particular points on a road. As for the distance sensor 33, a sensor adapted to measure the rotation speed of wheels of the vehicle and detect the distance based on the measured rotation speed, or a sensor adapted to measure the acceleration and integrate the measured acceleration twice thereby detecting the distance may be used.

The steering sensor 34 may detects a steering angle of the vehicle. As for the steering sensor 34, for example, an optical rotation sensor or a resistive rotation sensor attached to a rotating part of a steering wheel (not shown) or an angle sensor attached to a wheel may be used.

The gyroscopic sensor 35 may detects the angle of traverse of the vehicle. As for the gyroscopic sensor 35, for example, a gas-rate gyroscope or a vibrating gyroscope may be used. By integrating the angle of traverse detected by the gyroscopic sensor 35, it is possible to detect the direction of the vehicle.

The data storage unit 22 may include a hard disk (not shown) serving as an external storage device and a storage medium, programs stored on the hard disk, and a recording head (not shown) serving as a device for reading map information database 28 or the like from the hard disk and writing data on the hard disk. Additionally, another type of magnetic disk, a memory card, a magnetic tape, a magnetic drum, a CD, an MD, a DVD, an optical disk, an MO, an IC card, or optical card may be used as the external storage device.

In the map information database 28, map data necessary in providing route guidance and displaying a map may be stored. Again, the map data may be described, for example, in three hierarchical levels depending on the amount of information associated with road networks. The map data in each level includes map display data, intersection data associated with intersections, link data associated with links, node data associated with nodes, route search data used in route searching, facility data associated with facilities, and point search data used in point searching.

The route search data may be data used to search for a route to a specified destination defined in respective levels of map data. The route search data may include cost data including data indicating a cost associated with each node (hereinafter referred to as node cost) and data indicating cost associated with each link (hereinafter referred to as link cost) to calculate search cost. The route search data may include travel time data indicating times needed to pass through each link and route display data to display a route selected in the route searching process on a map on the liquid crystal display 25.

The node cost may be basically defined for a node corresponding to each intersection. In the navigation apparatus 20, the node cost may be determined depending on whether there is a traffic signal at an intersection and depending on the direction traveled through the intersection (e.g., the direction traveled and/or whether a route goes straight or turns to right or left at the intersection).

The link cost may be determined depending on a road attribute or the road type of each links, such as the road width, the number of lanes, the link length, the travel time, and/or congestion. Furthermore, in the traveled link identifying system 1, the link travel times and the link costs may be modified depending on traffic conditions indicated by the traffic information transmitted from the information probing center 3 (e.g., described bellow in step S105 in FIG. 17).

In addition to the route search data, the map data may include other data such as intersection data, link data, node data etc., as described above. However, these data are similar to those stored in the center map information database 16 (FIG. 2) in the information probing center 3, and thus an explanation thereof is omitted to avoid repetition.

When the distance from the current position (starting position) to the destination is small (e.g., about 3 km), the navigation ECU 23 may search for a route using only a grid of map data in the first level, that is, the lowest level, in a small area including the current position.

In a case in which the distance from the current position to the destination is in a middle range (e.g., about 50 km), route searching may be performed using a grid of map data in the first level, that is, the lowest level, for an area close to the current position and another area close to the destination, and using a grid of map data in a second level, that is, a middle level, for areas other than the areas close to the current position or the destination.

In a case in which the distance from the current position to the destination is in a long range (e.g., about 300 km), route searching may be performed such that a grid in the first level, that is, the lowest level, is used for an area close to the current position and another area close to the destination, a grid in the second level, that is, the middle level, is used for areas adjacent to the respective areas in the first level, and a grid in the third level, that is, the highest level, is used for areas adjacent to the respective areas in the second level. This allows, for example, a reduction in the amount of calculation needed in the route searching process, and thus a reduction in the route searching time may be achieved.

In the route searching process performed by the navigation ECU 23, the road data included in the route search data of the map data may be examined to calculate the search cost (including node costs and link costs) of roads in the grid used in the route searching process, and a route may be selected depending on the total search cost. Specifically, links described in the road data may be examined starting from both the starting position and the destination to find an optimum route. When a route found in searching started from the current vehicle position meets somewhere a route found in searching started from the destination, the sum of costs for the route from the current vehicle position and the sum of costs for the route from the destination may be added together to determine the total cost. The total cost may be calculated for each of a plurality of possible routes and route with the lowest total cost is automatically selected. Alternatively, a particular number of routes (e.g., three) with the lowest total cost, the second lowest total cost, and the third lowest total cost may be selected as candidates and a route may selected by a user from the candidates.

The content of the map information database 28 may be updated by transferring information from a storage medium such as a DVD or a memory card or by downloading information from a particular information center or the like via the terminal communication device 7.

The navigation ECU 23 may include a CPU 41 serving as a calculation/control unit responsible for control over the whole navigation apparatus 20, a RAM 42 used by the CPU 41 as a working memory in various calculations and also used to store route data detected in the route searching process, a ROM 43 for storing various control programs and a traffic information transmission program (FIG. 11) to receive traffic information from the information probing center 3 and search for an optimum route to a specified destination, and an internal storage device such as a flash memory 44 used to store a program read from the ROM 43. As for the RAM 42, the ROM 43, and the flash memory 44, a semiconductor memory or a magnetic core may be used. As for the calculation/control unit, an MPU may be used instead of the CPU 41.

Although various programs may be stored in the ROM 43 and various data may be stored in the data storage unit 22, programs and data may be stored in a single external storage device or a memory card and the program or data may be loaded into the flash memory 44 from the external storage device or the memory card. This allows the programs and/or data to be updated by replacing the external storage device or the memory card.

The navigation ECU 23 may be electrically connected to the operation unit 24 the liquid crystal display 25, the speaker 26, and peripheral devices (actuators) of the terminal communication device 7.

The operation unit 24 may include various keys and buttons serving as operation switches (not shown) used to input, for example, a start point from which route guidance is started and a destination at which the route guidance is ended. In accordance with switch signals generated when the switches are operated, the navigation ECU 23 controls various operations. As for the operation unit 24, a keyboard, a mouse, a barcode reader, a remote control, a joystick, a light pen, a stylus pen, etc., may also be used. A touch panel disposed on the front surface of the liquid crystal display 25 may also be used as the operation unit 34.

The liquid crystal display 25 may be used to display a wide variety of information such as operation guidance information, an operation menu, key guidance information, a navigation route from the current position to the destination, guidance information along the navigation route, traffic information, news, weather forecast information, time information, mail, and a television program. Instead of the liquid crystal display 25, a CRT display, a plasma display, or a hologram display adapted to project a hologram image on a windshield of the vehicle may be used.

The speaker 26 may be used to output audio (e.g., voice) guidance information about the navigation route under the control of the navigation ECU 23. Specific examples of voice guidance information are "Turn to the right at an intersection 300 m ahead" and "There is traffic congestion on National Road OO the vehicle is approaching." The voice guidance information may be output from the speaker 26 by using voice synthesis or by reading voice data recorded in advance on a tape, a memory, or the like. Various kinds of sounds may also be output by means of synthesis or recording.

The terminal communication device 7 may be adapted to receive not only traffic information transmitted from the information probing center 3 but also traffic information such as congestion information, traffic restriction information, parking area information, traffic accident information, etc., from a traffic information center such as a VICS® center. The terminal communication device 7 may be a beacon receiver adapted to receive radio wave beacon signals or light beacon signals via radio wave beacon devices or light beacon devices installed along roads. The terminal communication device 7 may be a network device capable of performing communication in a communication system using a communication network such as a LAN, a WAN, an intranet, a mobile telephone network, a telephone network, a public communication network, a private communication network, or the Internet. In order to receive the above-described information from the information center, the terminal communication device 7 may also include an FM receiver for receiving FM multiplex information such as news or weather forecast information from an FM broadcast station. The beacon receiver and the FM receiver may be disposed integrally in a single unit as a VICS® receiver or may be disposed separately.

Figure 7:
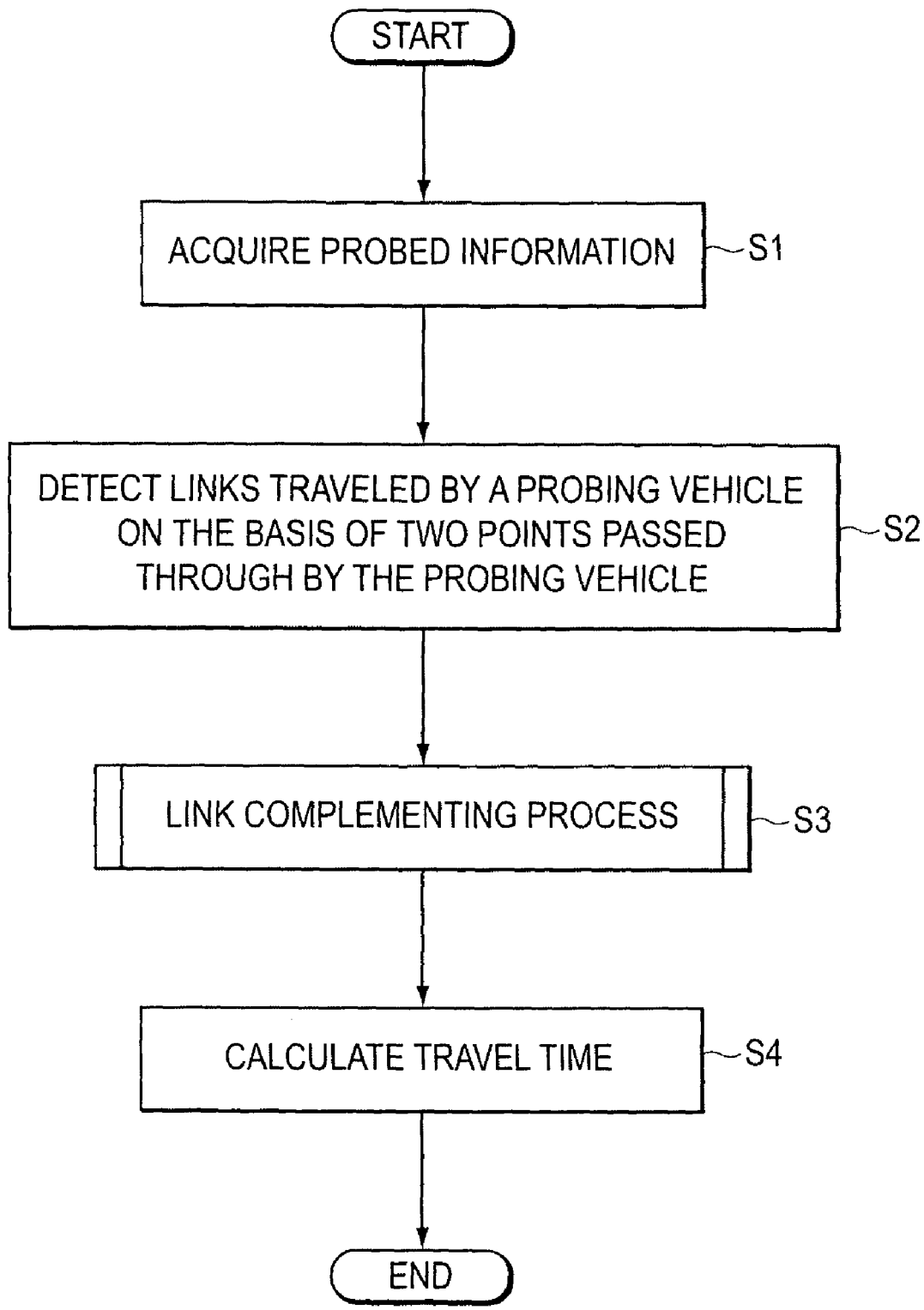
FIGS. 7 and 8 are flow charts showing an exemplary travel time calculation method.
Figure 8:
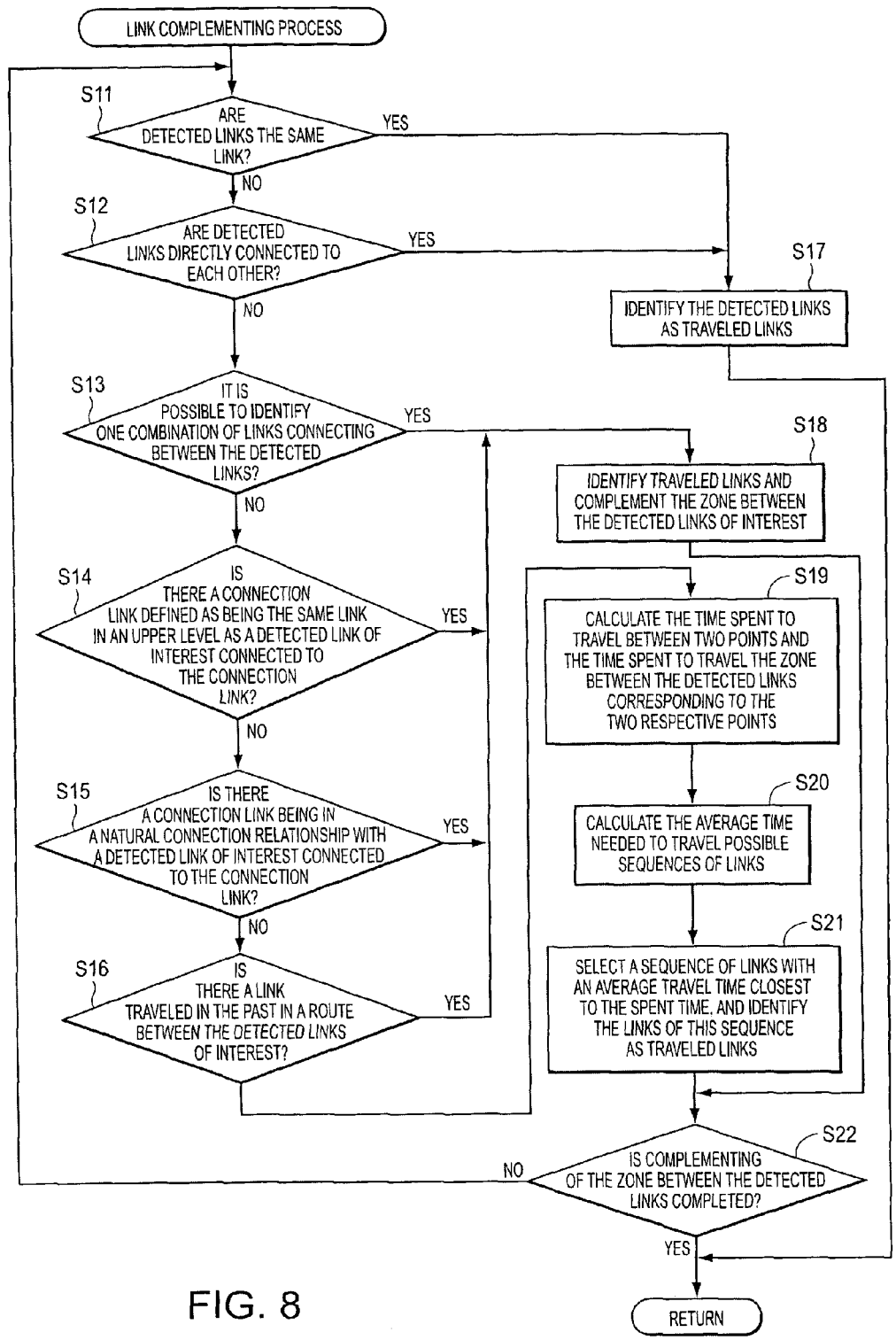

An exemplary travel time calculation method will be described below with respect to FIGS. 7 and 8. The exemplary methods may be implemented, for example, by one or more components of the above-described system. However, even though the exemplary structure of the above-described system may be referenced in the description, it should be appreciated that the structure is exemplary and the exemplary method need not be limited by any of the above-described exemplary structure.

The exemplary method may be used, for example, to identify links traveled by an information probing vehicle on the basis of position information indicating positions passed through in the past by the information probing vehicle at predetermined time intervals (e.g., described in data included in the probed information stored in the probed information database 15) and to determine travel times of respective links. Note that the method may be, for example, stored in the ROM 14 or the RAM 13 in the server 11 as a program instructions executable by the CPU 12 at predetermined time intervals (e.g., every 4 msec).

First in step S1, probed information is acquired. For example, the CPU 12 may receive via center communication device 6 probed information transmitted from information probing vehicles 2 at predetermined time intervals (e.g., every minute) and may store the received information in the probed information database 15. The probed information acquired herein may include information associated with a current vehicle position, a destination set in the navigation apparatus, a shift lever position, a steering angle, an accelerator pedal position, a brake pressure, a remaining engine oil quantity, a remaining fuel quantity, a seat belt wearing status, a vehicle speed, a vehicle running direction, a vehicle travel distance, a windshield wiper operation status, a turn signal status, and a current time.

In step S2, links traveled by a probed vehicle are detected on the basis of two points traveled through by the probe vehicle. For example, from the probed information acquired in step S1, position coordinates transmitted in the latest two transmission operations from the information probing vehicle 2 are acquired and two points indicated by these coordinates on the map are detected. Furthermore, links corresponding to the two respective points are detected (i.e., links traveled by the information probing vehicle 2) are detected from the link data described in the center map information database 16. Note that in this step S2, of various levels of the map data stored in the center map information database 16, the map data in the first level having the greatest amount of information associated with road networks is used to detect links.

Next, in step S3, a link complementing process is performed. In this process, of various links existing on possible routes between the links of interest detected in step S2, links traveled by the information probing vehicle 2 are identified, and the detected links of interest are complemented by the identified links. This may be done, for example, as shown in FIG. 8. In this link complementing process, as will be described later, the links traveled by the information probing vehicle 2 may be identified on the basis of the connection relationship between the detected links of interest and other links, the travel history of the information probing vehicle 2, and/or the link travel times recorded in the statistical link database 17.

Thereafter, in step S4, the travel times for the respective traveled links are calculated on the basis of the traveled links identified in step S3 and times at which the information probing vehicle 2 passed through the two respective points indicated by the coordinates detected in step S2. The calculated travel times for the respective traveled links are stored in the center map information database 16 so that the travel times can be transmitted as traffic information in response to a request from the terminal vehicle 4 (step S113 in FIG. 17).

Figure 9:
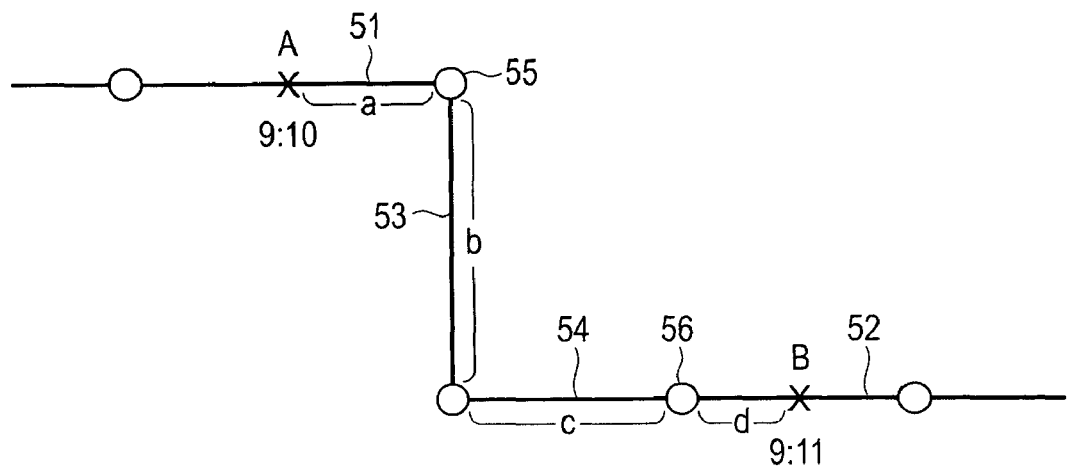
FIG. 9 is a schematic diagram showing an exemplary manner in which a link travel time is calculated.

FIG. 9 is an example of a process performed in step S4 to calculate a travel time for a traveled link. In the example shown in FIG. 9, the following assumption is made. That is, coordinates A and B indicating points passed through by the information probing vehicle 2 are acquired in step S1. Thereafter, in step S2, a link 51 is detected as a link corresponding to the coordinates A, and a link 52 is detected as a link corresponding to the coordinates B. Furthermore, in step S3, complementing a link 53 and complementing link 54 are identified as links traveled by the information probing vehicle 2 between the link 51 and the link 52.

In this example shown in FIG. 9, the information probing vehicle 2 passed through the point indicated by the coordinates A at time 9:10, and the point indicated by the coordinates B at time 9:11. Thus, it took 1 minute for the information probing vehicle 2 to travel from the coordinates A to the coordinates B. Therefore, the travel time for the link 53 and the travel time for the link 54 can be calculated using ratios among the distance a from the coordinates A to a node 55, the length b of the link 53, the length c of the link 54, and the distance d from a node 56 to the coordinates B. Furthermore, the travel time for the link 51 can be calculated using the ratio of the length of the link 51 to the distance a, and the travel time for the link 52 can be calculated using the ratio of the length of the link 52 to the distance d.

Figure 10:
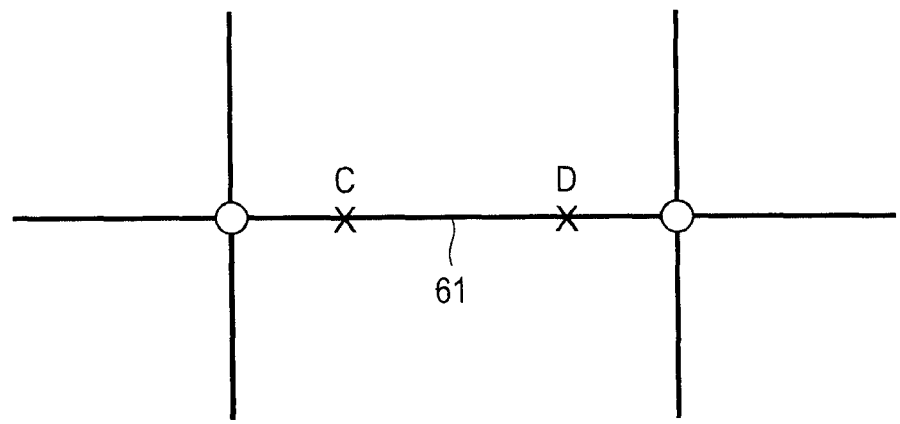
FIG. 10 is a schematic diagram showing an example in which two points indicated by detected position coordinates are located on the same link.

The an example of the link complementing process performed in step S3 is explained in further detail below with reference to FIG. 8. First, in step 11, it is determined (e.g., by the CPU 12) whether two points indicated by coordinates detected in step S2 are located on the same link. FIG. 10 shows an example in which two points indicated by coordinates detected in step S2 are located on the same link. In this example shown in FIG. 10, position coordinates C and D of the information probing vehicle 2 are acquired in step S1, and a link 61 is detected in step S2 for both position coordinates C and D. In this case, only the link 61 is identified as a link traveled by the information probing vehicle 2 between the coordinates C and the coordinates D.

Thus, in the example shown in FIG. 10, it is determined in step S11 that two points indicated by coordinates detected in step S2 are both located on the same link (step S11 is Yes), and the link (link 61) is identified as the link traveled by the information probing vehicle 2 (step S17). Thereafter, the process proceeds to step S4 to calculate the travel time for the link 61.

Figure 11:
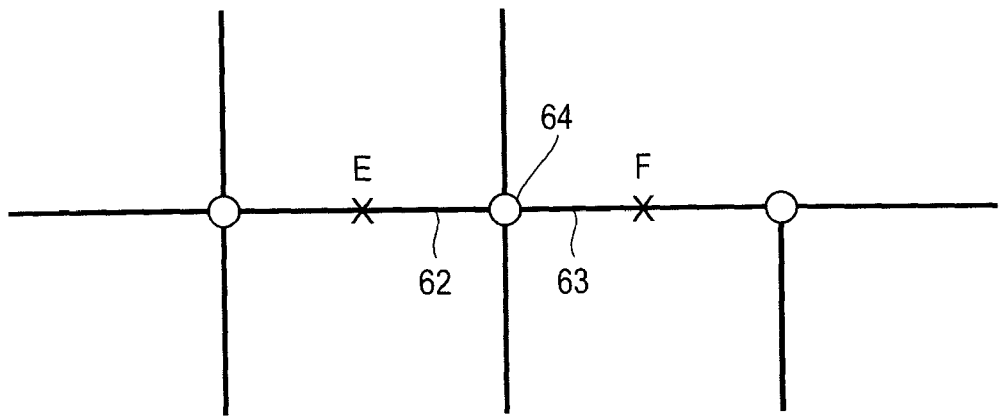
FIG. 11 is a schematic diagram showing an example in which links connected to respective links corresponding to two points indicated by detected position coordinates are directly connected to each other.

On the other hand, if it is determined that two points of coordinates are not located on the same link (step S11 is No), it is determined (e.g., by the CPU 12) whether two links, on which the respective points of coordinates detected in step S2 are located, are directly connected to each other (step S12). The determination as to whether they are directly connected to each other may be made using link data included in map data in the first level of the center map information database 16 and the link connection relationship list indicating relationship among the links in terms of connection. FIG. 11 is a schematic diagram showing an example in which links corresponding to two points of coordinates detected in step S2 are directly connected to each other. In the example shown in FIG. 11, coordinates E and coordinates F are detected as position coordinates of the information probing vehicle 2 are detected in step S1, and links 62 and 63 directly connected to each other at a node 64 are detected in step S2 as links corresponding to the respective coordinates E and F. Thus, in this example, links 62 and 63 are uniquely identified as links traveled by the information probing vehicle 2 between coordinates E and F.

Thus, in the example shown in FIG. 11, it is determined that links corresponding to two points of coordinates are directly connected to each other (step S12 is Yes), and these two links (links 62 and 63) are identified as links traveled by the information probing vehicle 2 (step S17). Thereafter, the process proceeds to step S4, in which travel times for the respective links 62 and 63 are calculated.

Figure 12:
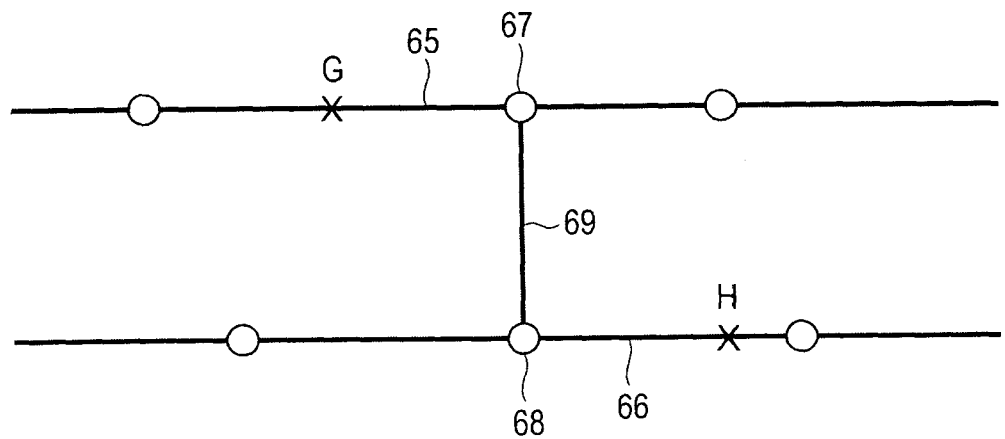
FIG. 12 is a schematic diagram showing an example in which one combination of one or more links can be uniquely identified as a route between links corresponding to two detected points.
Figure 13:
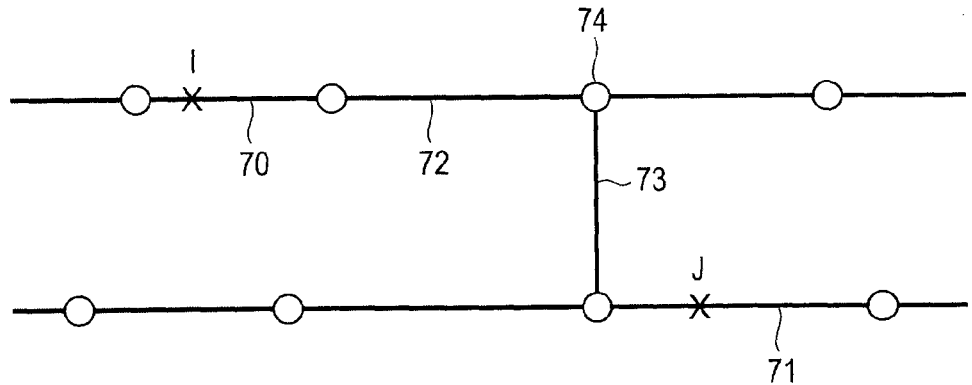
FIG. 13 is a schematic diagram showing an example in which one combination of one or more links can be uniquely identified as a route between links corresponding to two detected points.

On the other hand, if it is determined that links corresponding to two points of coordinates are not directly connected to each other (step S12 is No), it is determined (e.g., by the CPU 12) whether it is possible to uniquely identify one combination of one or more links connecting between the links corresponding to the two points of coordinates detected in step S2 (step S13). The determination as to whether it is possible to uniquely identify one combination of links may be made using link data included in map data in the first level of the center map information database 16 and the link connection relationship list indicating relationship among the links in terms of connection. FIGS. 12 and 13 are schematic diagrams showing examples in which it is possible to uniquely identify one combination of one or more links connecting between the links corresponding to the two points of coordinates detected in step S2.

In the example shown in FIG. 12, coordinates G and coordinates H are detected as position coordinates of the information probing vehicle 2 are detected in step S1, and links 65 and 66 are detected in step S2 as links corresponding to the respective coordinates G and H. Thereafter, a set of one or more links connected to the link 65 and a set of one or more links connected to the link 66 are checked to find a link included in common in both sets. In this specific example, a link 69 is found as a common link, which is connected to the link 65 via a node 67 and also connected to the link 66 via a node 68. In this case, the links 65 and 66 are connected to each other via only one link 69. Thus, link 69 constitutes a complementing link, and links 65, 69, and 66 are identified as links traveled by the information probing vehicle 2 between the coordinates G and the coordinates H.

On the other hand, in the example shown in FIG. 13, coordinates I and coordinates J are detected as position coordinates of the information probing vehicle 2 are detected in step S1, and links 70 and 71 are detected in step S2 as links corresponding to the respective coordinates I and J. Thereafter, set of one or more links connected to the link 70 and a set of one or more links connected to the link 71 are checked to find a link included in common in both sets. However, in this specific example, no common link included in both sets is found, and thus it is checked whether the former set includes a link connected to a link in the latter set. Herein, if there is only one combination of links connected to each other, it is determined that one combination of one or more links via which the links 70 and 71 are connected to each other can be uniquely identified. In the specific example shown in FIG. 13, a combination of links 72 and 73 connected to each other at a node 74 is only one possible combination of links. Thus, links 72 and 73 constitute complementing links, and links 70, 72, 73, and 71 are identified as links traveled by the information probing vehicle 2 between the coordinates I and the coordinates J. Note that if there are two or more links between the two sets of links, the above-described process is performed repeatedly.

Returning to FIG. 8, if it is determined that it is possible to uniquely identify a combination of one or more links connecting between the links of interest corresponding to the two respective coordinate points as in the example shown in FIG. 12 or 13 (step S13 is Yes), the combination of links (links 65, 66, and 69; or 71, 72, 73, and 74) may be identified as links traveled by the information probing vehicle 2, and the detected links of interest are complemented by the links identified as the traveled links (step S18). Thereafter, the processing flow proceeds to a determination process in step S22, which will be described later.

Figure 14:
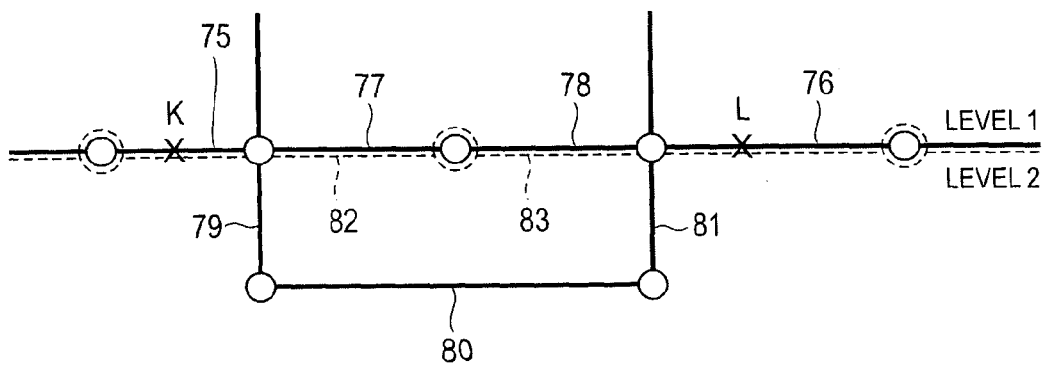
FIG. 14 is a schematic diagram showing an example in which links of interest and links directly connected to the respective links of interest belong to the same respective links defined in an upper-level map data.

If it is determined that it is impossible to uniquely identify one combination of one or more links connecting between the links of interest corresponding to two respective coordinate points (step S13 is No), it is determined (e.g., by the CPU 12) whether the links of interest corresponding to the two respective coordinate points detected in step S2 and the links directly connected to the links of interest belong to same respective links in the map data in the upper level (step S14). The determination, as to whether the links of interest and the links directly connected to the respective links of interest belong to the same respective links in the upper-level map data, is made on the basis of the link data of the map data in the first to third levels described in the center map information database 16, and the link connection relationship list indicating the connection relationships among links. FIG. 14 shows a specific example in which links of interest corresponding to two points detected in step S2 and links directly connected to the respective links of interest belong to the same respective links in the upper-level map data.

In the example shown in FIG. 14, coordinates K and L are acquired in step S1 as position coordinates indicating two points passed through by the information probing vehicle 2, and, in step S2, a link 75 is detected as a link corresponding to the coordinates K and a link 76 is detected as a link corresponding to the coordinates L. In this specific example, in map data in the first level, there are two possible routes between the links 75 and 76. That is, one is a route provided by a combination of links 77 and 78, and the other one of which is a route provided by a combination of links 79, 80, and 81. Thus, it is impossible to uniquely identify traveled links.

However, the links 77 and 75, which are different links in the first level are both included in the same single link 82 in the map data in the second level, and the links 78 and 76 in the first level are both included in the same single link 83 in the second level. Thus, in this case, the links 77 and 78 are identified as links traveled by the information probing vehicle 2 between the coordinates K and L in addition to the links 75 and 76.

If it is determined that the links of interest corresponding to the two respective points and the links directly connected to the respective links of interest belong to the same respective links in the upper-level map data as is the case in the example shown in FIG. 14 (step S14 is Yes), combinations of links determined as belonging to the same respective links in the higher level (the combination of links 75 and 77 and the combination of links 76 and 78) may be identified as links traveled by the information probing vehicle 2, and the detected links of interest may be complemented by the links identified as the traveled links (step S18). Thereafter, the processing flow proceeds to a determination process in step S22.

In step S22, the CPU 12 determines whether as a result of the completing process performed in step S18, a complete sequence of links has been obtained as a route between the two coordinate points detected in step S2. If it is determined that a complete sequence of links has not yet been obtained via the completing process (step S22 is No), the process returns to step S11 to repeat identifying of traveled links and completing of links.

Thus, in the example shown in FIG. 14, the link 77 and the link 78 incorporated as complementary links are directly connected to each other (step S12 is Yes), and thus in step S17, the combination of links 75, 77, 78, and 76 is uniquely identified as a route traveled by the information probing vehicle 2 between the coordinates K and L. Thus, the link completing process is successfully completed.

Figure 15:
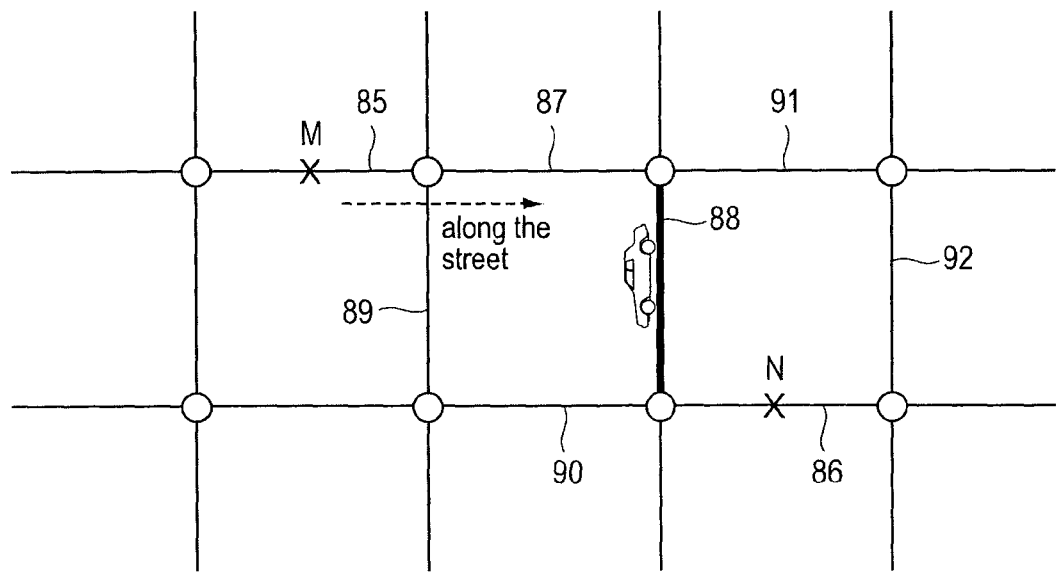
FIG. 15 is a schematic diagram showing an example in which a connection link is in a natural link connection relationship with one of links of interest, and also showing an example in which a link traveled in the past by an information probing vehicle is detected in links between the two links of interest.

If it is determined that no link belonging to the same single link in the upper-level map data is detected for either one of the links corresponding to the two respective coordinate points (step S14 is No), it is determined whether a connection link connected to one of the links corresponding to the two respective coordinate points detected in step S2 has a natural link connection relationship with one of the links corresponding to the two respective coordinate points (step S15). The determination as to the natural link connection relationship may be made on the basis of the link data of the map data in the first to third levels described in the center map information database 16, the link connection relationship list indicating connection relationships among the links, and a natural link connection list indicating connection links having the natural link connection relationship. Referring to FIG. 15, an example is described below in which a connection link has the natural link connection relationship with one of the links of interest corresponding to the two respective points represented by the coordinates detected in step S2.

In the example shown in FIG. 15, coordinates M and N are acquired in step S1 as position coordinates indicating points passed through by the information probing vehicle 2, and, in step S2, a link 85 is detected as a link corresponding to the coordinates M and a link 86 is detected as a link corresponding to the coordinates N. In this specific example, there are three possible routes between the links 85 and 86, that is, a route provided by a combination of links 87 and 88, a route provided by a combination of links 89 and 90, and a route provided by a combination of links 87, 91, and 92, and thus it is impossible to uniquely identify traveled links.

However, assuming a natural link connection list indicates that, of links directly connected to the link 85 of interest, the link 87 has a natural link connection relationship with the link 85. Thus, in addition to the links 85 and 86, the link 87 is identified as a link traveled by the information probing vehicle 2 between the coordinates M and N.

If it is determined that one or both of the links of interest corresponding to two coordinate points have a connection link having the natural link connection relationship, as in the example shown in FIG. 15 (step S15 is Yes), the connection link (the link 87) is identified as a link traveled by the information probing vehicle 2, and the detected links of interest are complemented by the link identified as the traveled links (step S18). Thereafter, the processing flow proceeds to a determination process in step S22, and because the traveled links have not yet been fully identified, returns to step S11.

If it is determined that neither one of the links of interest corresponding to two coordinate points has a connection link having the natural link connection relationship (step S15 is No), it is determined whether possible links between the two points represented by the position coordinates detected in step S2 include a link traveled in the past by the information probing vehicle 2 (step S16). The determination as to whether there is a link traveled in the past is made on the basis of the link data of the map data in the first to third levels described in the center map information database 16, the link connection relationship list indicating connection relationships among the links, and a travel history database 18. Referring to FIG. 15, an example is described below in which a link traveled in the past by the information probing vehicle 2 is found in possible links between the two points represented by position coordinates detected in step S2.

In the example shown in FIG. 15, it is assumed that, of possible links 87 to 92 between links 85 and 86, a link 88 is a link traveled in the past by the information probing vehicle 2. In this case, in addition to the links 85 and 86, the link 88 is identified as a link traveled this time by the information probing vehicle 2 between the two points represented by the coordinates M and N. Alternatively, in step S16, a determination may be made as to whether there is a link traveled in the past a plurality of times (for example, three or more times) by the information probing vehicle 2, and such a link may be identified as a link traveled this time.

When a link traveled in the past by the information probing vehicle 2 is found in links between the two points represented by position coordinates, as in the example shown in FIG. 15 (step S16 is Yes), the link identified as the link traveled in the past (the link 88) is identified as a link traveled this time by the information probing vehicle 2, and the detected links of interest are complemented by the links identified as the traveled links (step S18). Thereafter, the processing flow proceeds to the determination process in step S22, and because the traveled links have not yet been fully identified, returns to step S11.

In the example shown in FIG. 15, as described above, the link 87 determined as having the natural link connection relationship has been employed as a complementary link, and the link 88 determined as a link traveled in the past by the information probing vehicle 2 has been employed as a complementary link. In this case, the links 87, 88 and 86 links are connected to each other (step S12 is Yes), and thus in step S17, the combination of links 85, 87, 88, and 86 is uniquely identified as a route traveled by the information probing vehicle 2 between the coordinates M and N. Thus, the link completing process is successfully completed.

If no link traveled in the past by the information probing vehicle 2 is found in the links between the links corresponding to the two points represented by the coordinates (step S16 is No), the processing flow proceeds to step S19.

In step S19, the CPU 12 calculates the time spent by the information probing vehicle 2 to travel each link between the two points detected in step S2 (hereinafter, a "link-to-link travel time"). Furthermore, using the calculated link-to-link travel times, the CPU 12 further calculates the time taken to travel a sequence of links therethrough connecting the links of interest corresponding to the two points represented by the coordinates (a "sequence-of-links travel time").

In step S20, the average sequence-of-links travel time indicating the average of times taken in the past to travel the sequence of links therethrough connecting the two points detected in step S2 on the basis of a statistical link database 17. Specifically, the average travel time for each link is calculated from data stored in the statistical link database 17 in terms of times taken in the past by the information probing vehicle 2 to travel each link, and the average sequence-of-links travel time is determined by calculating the sum of the average travel times of the respective links.

In step S21, the current time spent to travel the sequence of links, calculated in step S19, is compared with the average sequence-of-links travel times calculated in step S20 to find a sequence of links with an average sequence-of-links travel time closest to the current time spent to travel the sequence of links. If such a sequence of links is found, the found sequence of links is identified as traveled links.

Figure 16:
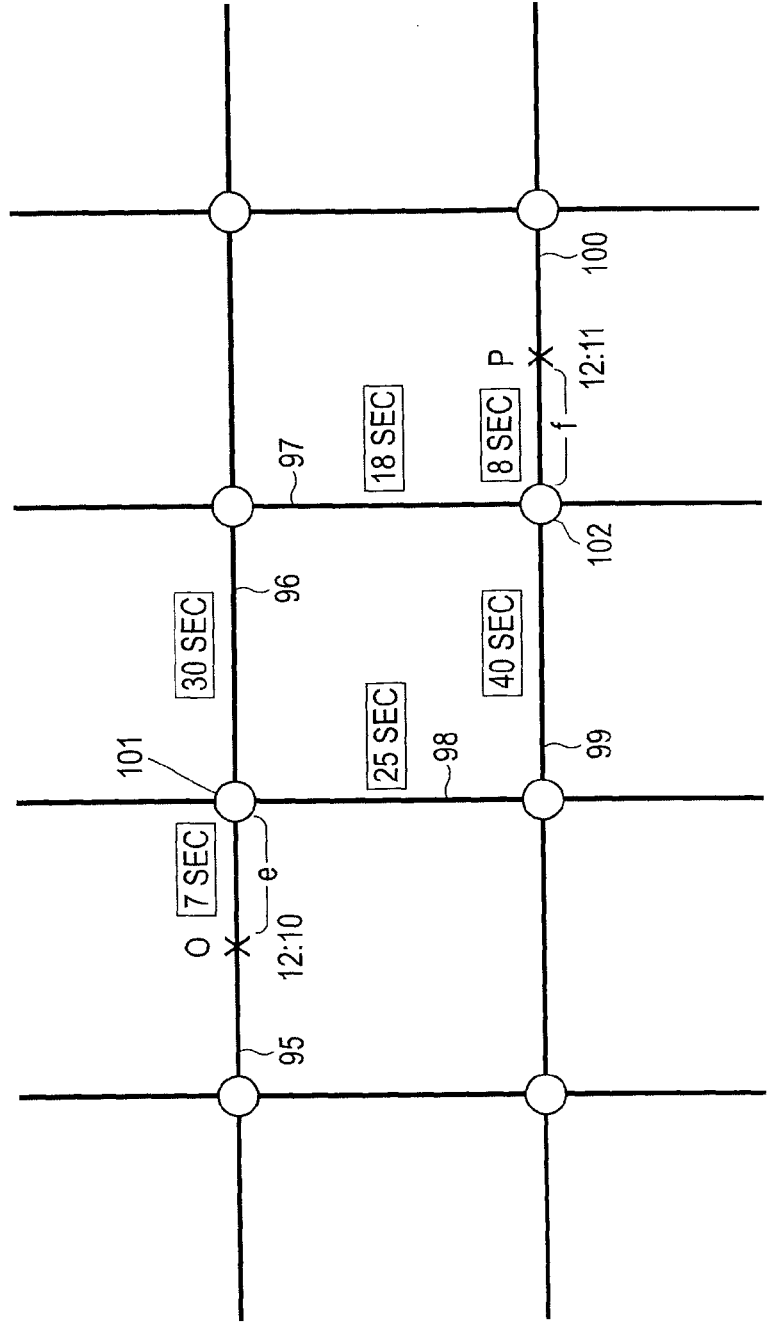
FIG. 16 is a schematic diagram showing an example of a traveled link identification process.

Referring to FIG. 16, a specific example of the traveled link identification process in steps S19 to S21 is described below.

In the example shown in FIG. 16, coordinates O and P are acquired in step S1 as position coordinates indicating points passed through by the information probing vehicle 2. In step S2, a link 95 is detected as a link corresponding to the coordinates O and a link 100 is detected as a link corresponding to the coordinates P. In this specific example, there are two possible routes between the links 95 and 100, that is, a route provided by a combination of links 96 and 97, and a route provided by a combination of links 98 and 99, and thus it is impossible to uniquely identify traveled links.

In this specific example, the point indicated by the coordinates O was passed through at 12:10 by the information probing vehicle 2, and the point indicated by the coordinates P was passed through at 12:11 by the information probing vehicle 2. Thus, in step S19, the link-to-link travel time is calculated as 60 seconds. Furthermore, using the ratio of the length of a zone e from the coordinates O to a node 101 to the length of the link 95, and using the travel time for the link 95 read from the statistical link database 17, the travel time needed to travel the zone e is calculated (7 seconds). Similarly, using the ratio of the length of a zone f from the coordinates P to a node 102 to the length of the link 100, and using the travel time for the link 100, the travel time needed to travel the zone f is calculated (8 seconds). The sequence-of-links travel time is then calculated by extracting the travel times needed to travel the zones e and f from the link-to-link travel time (45 seconds).

The average travel time for each of links 96 to 99 can be calculated from data recorded in the statistical link database 17 in terms of travel times spent in the past to travel each link by the information probing vehicle 2. Specifically, in the example shown in FIG. 16, the average travel time for the link 96 is calculated as 30 seconds, the average travel time for the link 97 as 18 seconds, the average travel time for the link 98 as 25 seconds, and the average travel time for the link 99 as 40 seconds. Thus, for a sequence of links 96 and 97, which is one of sequences of links that is possible as a route between the coordinates O and P, the average travel time is calculated as 48 seconds. On the other hand, the average travel time for a sequence of links 98 and 99, which provides another possible route between the coordinates O and P, is calculated as 65 seconds.

Thus, the average travel time for the sequence of links 96 and 97 is closest to 45 seconds determined as the sequence-of-links travel time. In this case, the links 96 and 97 are identified as links traveled by the information probing vehicle 2 between the coordinates O and P.

Thereafter, in step S22, the CPU 12 determines whether as a result of the completing process performed in step S21, a complete sequence of links has been obtained as a route between the two coordinate points detected in step S2. If it is determined that a complete sequence of links has been obtained via the completing process (S22 is Yes), the process proceeds to step S4. In step S4, the travel time for each of links determined as the complementary links is calculated.

On the other hand, if it is determined that a complete sequence of links has not yet been obtained via the completing process (S22 is No), the process returns to step S11 to repeat identifying of traveled links and completing of links.

Figure 17:
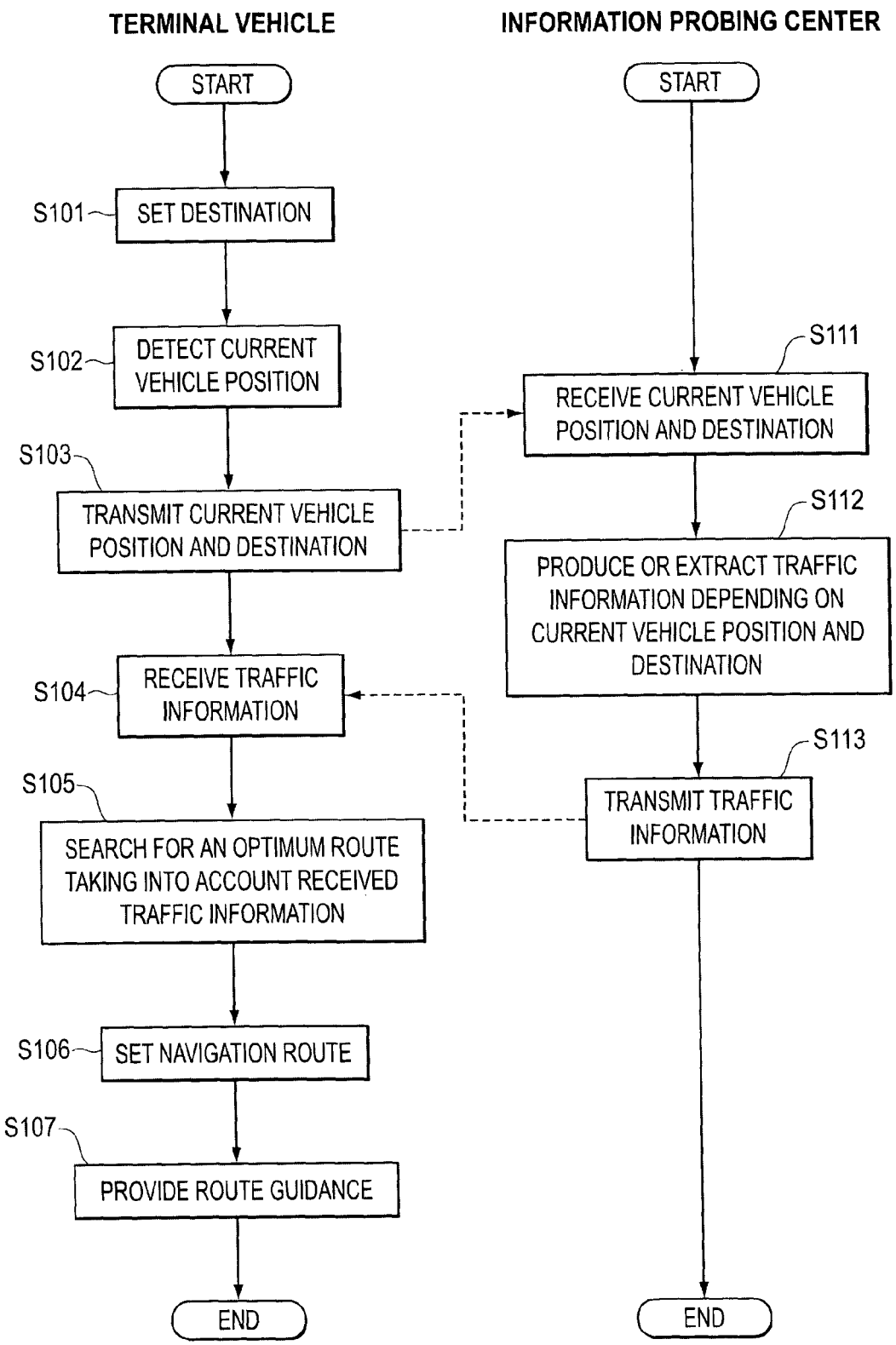
FIG. 17 is a flow chart showing an exemplary traffic information transmission method.

Now, with reference to FIG. 17, a traffic information transmission method will be described. Again, the exemplary methods may be implemented, for example, by one or more components of the above-described system. However, even though the exemplary structure of the above-described system may be referenced in the description, it should be appreciated that the structure is exemplary and the exemplary method need not be limited by any of the above-described exemplary structure.

The program may be, for example, stored in the RAM 42 or the ROM 43 disposed in the navigation apparatus 20 or in the RAM 13 or the ROM 14 disposed in the server 11, and may be executed by the CPU 41 or the CPU 12.

In step S101, the CPU 41 sets a destination in accordance with an operation performed by a user on the operation unit 24. Next, in step S102, the current position of the vehicle (the terminal vehicle 4) is detected using the current position detecting unit 21. Thereafter, in step S103, information associated with the destination set in step S101 (specifically, an ID of a facility or the like specified as the destination, position coordinates of the destination, etc.) and information associated with the current vehicle position detected in step S102 (specifically, position coordinates of the current vehicle position) are transmitted to the information probing center 3 via the terminal communication device 7.

In step S104, traffic information (including the link travel time calculated in step S4) transmitted from the information probing center 3 is received via the terminal communication device 7. Next, in step S105, a route for the destination is searched for on the basis of the traffic information received in step S104.

For example, first, road data of search data in the map data is examined and the search cost (the node cost and the link cost) is calculated for roads included in a grid used in the searching, in accordance with the traffic information received in step S104. When a route found in searching started from the current vehicle position meets somewhere a route found in searching started from the destination, the sum of costs for the route from the current vehicle position and the sum of costs for the route from the destination are added together to determine the total cost. The total cost is calculated for each possible route, and a route having a minimum total cost is selected.

In step S106, the route selected in the searching process in step S105 is set as a navigation route. Thereafter, guidance information is provided along the navigation route, using the liquid crystal display 25 and/or the speaker 26 (step S107).

Now, referring to FIG. 17, a travel prediction method, e.g., executed by the CPU 12 of the server 11 is described below. First, in step 111, the CPU 12 receives information indicating the current position of the terminal vehicle 4 transmitted in step S103 from the terminal vehicle 4, and also receives information associated with the specified destination from the center communication device 6.

Next, in step S112, the CPU 12 produces traffic information in accordance with the current position of the terminal vehicle 4 and the specified destination indicated by the information received in step S111. Specifically, traffic information (indicating, e.g., congestion, average vehicle speeds, etc.)

associated with areas to be searched to find an optimum route from the current position of the terminal vehicle 4 to the destination is produced from the probed information database 15. The travel time for each link in the related areas is also extracted from the link travel times determined in step S4.

Next, in step S113, the traffic information produced or extracted in step S112 is transmitted to the terminal vehicle 4 from the center communication device 6. Then, the method ends.

In the exemplary traveled link identifying system 1 described above, two points passed through by the information probing vehicle 2 may be detected from position coordinate information included in the probed information transmitted from the information probing vehicle 2, and links corresponding to these two points are determined (step S2). If a combination of links is uniquely identified as a route between the links corresponding to the two respective points (step S13 is Yes), the links of this combination are identified as links traveled by the vehicle (step S18). Thus, it is possible to correctly identify links traveled by the vehicle on the basis of acquired information indicating the vehicle position taking into account connection relationships among links, and it is possible to correctly determine traffic congestion, travel times, and other traffic parameters on the basis of the identified links.

If it is determined that a detected link of interest and a connection links directly connected to the detected link of interest both belong to the same single link defined in the upper-level map data (step S14 is Yes), the connection link is identified as a link traveled by the vehicle (step S18). That is, links traveled by the vehicle may be correctly identified on the basis of acquired information indicating the vehicle position taking into account link definition in different levels.

If it is determined that a connection link directly connected to a detected link of interest has the natural link connection relationship with the link of interest, (step S15 is Yes), the connection link is identified as a link traveled by the vehicle (step S18). Thus, it is possible to correctly identify links traveled by the vehicle on the basis of acquired information indicating the vehicle position taking into account the relationship among links.

When a link traveled in the past by the information probing vehicle 2 is found in links existing between the detected links of interest, (step S16 is Yes), the found link is identified as a link traveled this time by the information probing vehicle 2 (step S18). Thus, it is possible to correctly identify links traveled by the vehicle on the basis of acquired information indicating the vehicle position taking into account the travel history.

When a sequence of links is detected which has an average travel time closest to a time spent this time by the information probing vehicle 2 between the detected two points, the detected sequence of links is identified as a sequence of links traveled this time by the information probing vehicle 2 (step S21). Thus, it is possible to correctly identify links traveled by the vehicle on the basis of acquired information indicating the vehicle position taking into account the link travel time.

The travel time for each link is calculated on the basis of the identified link or the identified sequence of links (step S4), and thus it is possible to accurately calculate the travel time of each traveled link on the basis of the information transmitted from the information probing center 3 or from the actually running information probing vehicle 2.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the examples described above, coordinates of two points passed through the information probing vehicle 2 are detected (step S2), and links traveled by the information probing vehicle 2 between the two points are identified. Alternatively, coordinates of three or more points passed through by the information probing vehicle 2 may be detected, and links traveled by the information probing vehicle 2 among these points may be identified.

After coordinates of two points passed through by the information probing vehicle 2 are detected (step S2), the two points may be respectively set as a starting point and a destination, and a route may be searched for between these two points. If a route is found as a result of the searching, the found route may be identified as a route traveled by the information probing vehicle 2.

In the examples described above, the current position of the information probing vehicle 2 and the current time are transmitted from the information probing vehicle 2 to the information probing center 3 at predetermined time intervals (e.g., every minute). Alternatively, the above information may be transmitted at predetermined distance intervals (e.g., every 100 m) or the information may be transmitted each time a node is passed through.

According to the above examples, when it is determined that it is possible to uniquely identify one combination of one or more links connecting between detected links of interest, the identified combination of links may be identified as links traveled by the vehicle. Thus, it is possible to correctly identify links traveled by the vehicle on the basis of acquired information indicating the vehicle position taking into account connection relationships among links, and it is possible to correctly determine traffic congestion, travel times, and other traffic parameters on the basis of the identified links.

Furthermore, when it is determined that a detected link of interest and a connection link directly connected to the detected link of interest both belong to the same single link defined in an upper level of map data, this connection link may be identified as a link traveled by the vehicle. That is, links traveled by the vehicle are correctly identified on the basis of acquired information indicating the vehicle position taking into account link definition in different levels, and it is possible to correctly determine traffic congestion, travel times, and other traffic parameters on the basis of the identified links.

When it is determined that a connection link directly connected to the detected link of interest has the natural link connection relationship with the link of interest, this connection link may be identified as a link traveled by the vehicle. Thus, it is possible to correctly identify links traveled by the vehicle on the basis of acquired information indicating the vehicle position taking into account the relationship among links, and it is possible to correctly determine traffic congestion, travel times, and other traffic parameters on the basis of the identified links.

When a link traveled in the past by the vehicle is found in links between the detected links of interest, the found link may be identified as a link traveled this time by the vehicle. Thus, it is possible to correctly identify links traveled by the vehicle on the basis of acquired information indicating the vehicle position taking into account the travel history, and it is possible to correctly determine traffic congestion, travel times, and other traffic parameters on the basis of the identified links.

Furthermore, of possible sequences of links between detected links of interest, a sequence of links having a statistical sequence-of-links travel time closest to a current travel time may be identified as a sequence of links traveled by the vehicle. Thus, it is possible to correctly identify links traveled by the vehicle on the basis of acquired information indicating the vehicle position taking into account the link travel time, and it is possible to correctly determine traffic congestion, travel times, and other traffic parameters on the basis of the identified links.

The travel time for the link traveled by the vehicle may be calculated on the basis of the link identified as the traveled link and on the basis of the time needed for the vehicle to travel the identified link, and thus it is possible to accurately calculate the travel time for the traveled link on the basis of the information supplied from the vehicle which has actually traveled the link.

The travel time for each link included in the sequence of links traveled by the vehicle may be calculated on the basis of the sequence of links identified as traveled links and on the basis of the time calculated by the sequence-of-links travel time calculation means, and thus it is possible to accurately calculate the travel time for each of the traveled links on the basis of the information supplied from the vehicle which has actually traveled the links.

What is claimed is:

1. A traveled link identifying system, comprising:
    a communication device that receives information representing current positions of probe vehicles, the information acquired from each probe vehicle at predetermined distance intervals or at predetermined time intervals;
    a memory that stores map data in a plurality of hierarchical levels and connection relationships between links included in the map data for each of the plurality of hierarchical levels, each level defined based on the detail of road information within the map data; and
    a controller that:
        acquires position information from the communication device;
        detects links traveled by a probe vehicle on the basis of the acquired position information by using the map data in a first level having the most detail of road information;
        determines, based on the stored connection relationships indicating relationships among the links included in the map data in the first level, whether there is only one connection between the detected traveled links, the connection composed of one link or a combination of links; and
        identifies, if there is only one connection between the detected traveled links, the link or combination of links composing the connection as a link or links traveled by the probe vehicle.

2. The system of claim 1, wherein the controller:
    determines, based on the stored connection relationships, whether a connection link connected to a first detected traveled link, which is one of the detected traveled links, and the first detected traveled link have a natural link connection relationship; and
    identifies, if the connection link and the first detected traveled link have the natural link connection relationship, the connection link as the link traveled by the probe vehicle.

3. The system of claim 1, wherein:
    the memory records a travel history of the vehicle; and
    the controller:
        determines, based on the recorded travel history, whether the connection between the detected traveled links include a link previously traveled by the vehicle; and
        identifies, if the connection between the detected traveled links include a link previously traveled by the vehicle, the link previously traveled by the vehicle as the link traveled by the probe vehicle.

4. The system of claim 1, wherein:
    the memory stores a statistical travel time for each link; and
    the controller:
        detects points passed through by the probe vehicle based on the acquired position information, a first detected point located on a first of the detected traveled links and a second detected point located on a second of the detected traveled links;
        calculates a current travel time needed for the probe vehicle to travel from the first detected point to the second detected point;
        based on the calculated current travel time, determines a current time needed to travel a sequence of links connecting the first detected traveled link and the second detected traveled link;
        based on the stored statistical travel time for each link, determines times previously necessary to travel various sequences of links connecting the first detected traveled link and the second detected traveled link;
        identifies a sequence of links from the various sequence of links whose previous travel time is closest to the determined current travel time; and
        sets the identified sequence of links as the links traveled by the probe vehicle.

5. The system of claim 1, wherein the controller:
    calculates a link travel time based on the links traveled by the probe vehicle and a time necessary for the probe vehicle to travel the links traveled by the probe vehicle.

6. A navigation system comprising the traveled link identification system of claim 5, wherein the controller calculates a route for a host vehicle based on the calculated link travel time.

7. A navigation system comprising the traveled link identification system of claim 1.

8. An information probing center comprising the traveled link identification system of claim 1.

9. A traveled link identifying system, comprising:
    a communication device that receives information representing current positions of probe vehicles, the information acquired from each probe vehicle at predetermined distance intervals or at predetermined time intervals;
    a memory that stores map data in a plurality of hierarchical levels and connection relationships between links included in the map data for each of the plurality of hierarchical levels, each level defined based on the detail of road information within the map data; and
    a controller that:
        acquires position information from the communication device;
        detects links traveled by the probe vehicle on the basis of the acquired position information by using the map data in a first level having the most detail of road information;
        determines, based on the stored connection relationships, whether a connection link connected to a first detected traveled link, which is one of the detected traveled links, and the first detected traveled link belong to a same link in a level of the map data with less detail than the first level; and identifies, if the connection link and the first detected traveled link belong to the same link in the level of the map data with less detail than the first level, the connection link as a link traveled by the probe vehicle.

10. The system of claim 9, wherein the controller:
calculates a link travel time based on the links traveled by the probe vehicle and a time necessary for the probe vehicle to travel the path traveled by the probe vehicle.

11. A navigation system comprising the traveled link identification system of claim 10, wherein the controller calculates a route for a host vehicle based on the calculated link travel time.

12. A navigation system comprising the traveled link identification system of claim 9.

13. An information probing center comprising the traveled link identification system of claim 9.

* * * * *